Aug. 22, 1933.    C. HEDDON    1,923,263
LINE GUIDE
Filed April 13, 1931
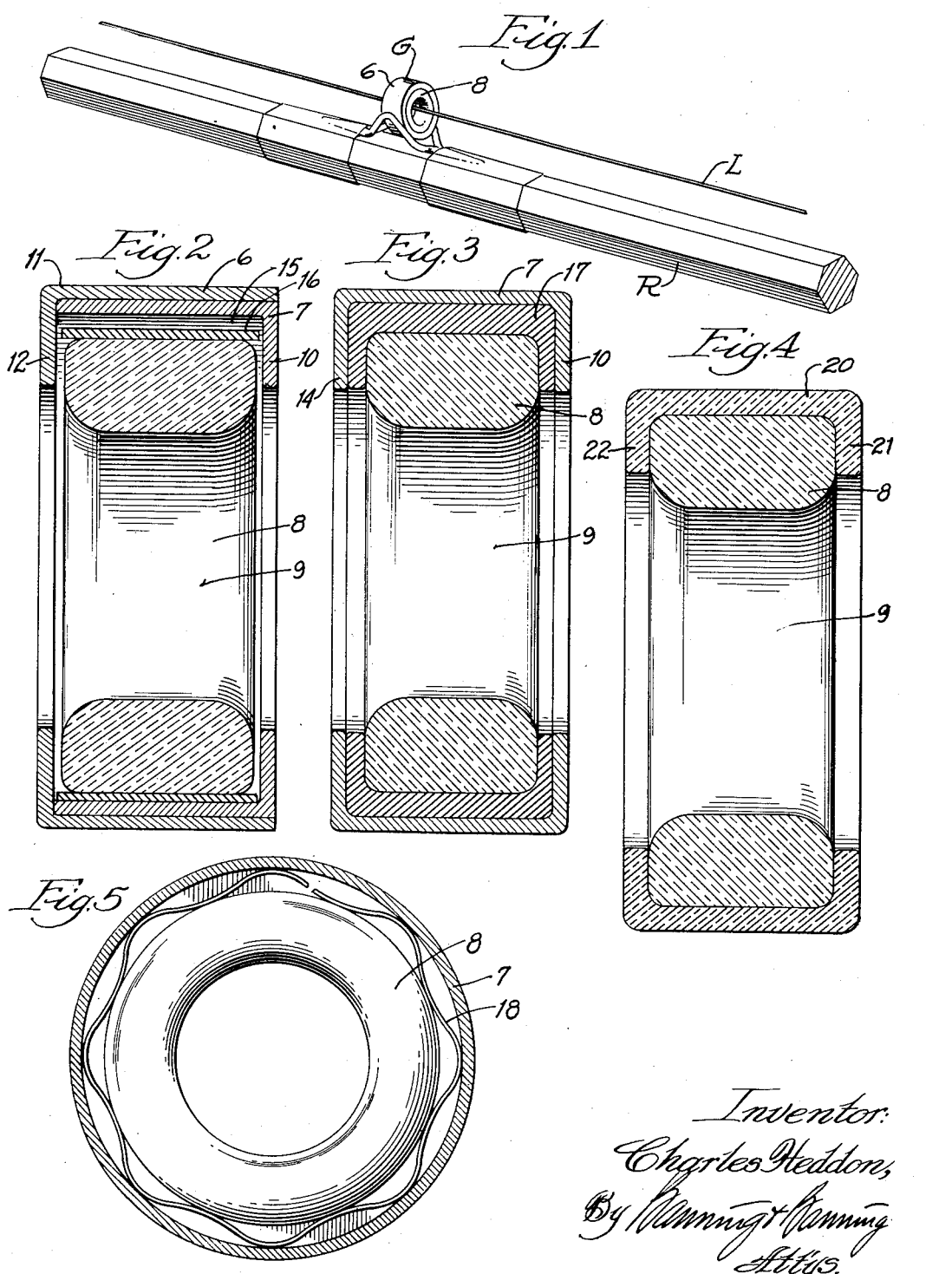
Inventor:
Charles Heddon,
By Banning & Banning
Attys.

Patented Aug. 22, 1933

1,923,263

UNITED STATES PATENT OFFICE 1,923,263

LINE GUIDE

Charles Heddon, Dowagiac, Mich., assignor to James Heddon's Sons, Dowagiac, Mich., a Corporation of Michigan Application April 13, 1931. Serial No. 529,606

11 Claims. (Cl. 43—24)

This invention relates to a line guide adapted for mounting upon a fishing rod for loosely confining an associated fishing line.

It is a primary object of this invention to devise a line guide structure with a friction element protected to the utmost from external shocks such as often produce a split or break in the guide per se; to utilize a guiding element of minimum size consistent with the desired clearance for movement of the line therethrough; and to mount the line guide in such a manner that it is protected externally withal being movable laterally of the line, and otherwise.

These various objects are all attained by the present line guide which is of simple and inexpensive construction.

The features of improvement characterizing this invention may be physically embodied as suggested in the exemplification illustrated in the accompanying drawing, wherein—

Figure 1 is a fragmentary perspective view of a fishing rod showing one line guide in position thereon;

Fig. 2 is an enlarged vertical section through a two-part floating mounting for the guide;

Fig. 3 is a similar view of a one-part semi-floating mounting for the guide;

Fig. 4 is a similar view of a self-sustaining cushion mounting for the guide; and Fig. 5 is a similar view of a spring mounting for the guide.

It is customary to equip a rod R with a fishing line L adapted to pass through a series of guides G of which a single example is shown in Figure 1. As indicative of one guide construction which will satisfactorily answer the purposes of this invention, I have shown a frame 6 in the form of an annulus carried fast upon the rod for supporting an open ended case 7 in which is held a guiding ring 8, also in the form of an annulus made desirably of agate, and having an opening 9 through which the line is threaded. By such an assembly of parts, a friction element in the form of an apertured guide is properly supported for confining the movements of the line L.

According to the present invention, the guide per se, i. e., the ring 8, is confined within a case having opposed inturned flanges forming a channel within which the friction element is loosely positioned. The case may be of one piece of metal, as suggested in Fig. 3, or may be otherwise formed as, for example, is shown in Fig. 2, wherein a duplex construction is indicated. In this latter form the case 7 having a flange 10 at one end is telescoped within an outer shell 11 having a flange 12 opposite to and co-acting with the case flange 10 to provide an annular channel within which the friction element is confined. The shell may conveniently be connected to the case by a drive fit, or otherwise. A one-part case 7, as shown in Fig. 3, is advantageously produced by forming, in addition to the flange 10 at one end, a second flange 14 at the opposite end, thereby providing an annular channel similar in all respects to that shown in the construction of Fig. 2. Irrespective of the particular construction of the case which furnishes a mounting for the guide therewithin, it is contemplated that some sort of a support therefor will be provided as, for example, the frame 6 shown in Fig. 1, which is carried securely on the rod.

A point of major importance to this invention is the character of mounting for the guide which desirably is of the full or semi-floating type. An example of a full floating mounting is indicated in Fig. 2, wherein an open space 15 is provided on all sides of the line guide, the clearance being sufficient to permit the guide to shift radially or longitudinally of its own axis within the limits determined by the confining case. Preferably some sort of a cushion or pad 16 is interposed, and this may be carried on the guiding ring so as to engage with the proximate face of the confining case, as the former is moved against the latter. Such a cushion, which is desirably resilient, may be produced satisfactorily from sheet cork or other like material.

In the semi-floating mounting shown in Fig. 3, I provide between the guide and confining case a substantial space filled with a cushion 17 which may give or yield in response to any force tending to move the guide in the direction of one of the case walls. Another example of semi-floating mounting is suggested in Fig. 5 wherein the cushion means interposed between the guide and case consists of a flexible leaf spring 18 suitably corrugated or undulated to support the guide resiliently within its mounting. The principal, and in fact the only, difference between these two mountings of Fig. 2 on the one hand and the mounting of Figs. 3 and 5 on the other hand, is in the degree of movement which the guide is permitted to make. In the former, it is entirely free to float without restriction, whereas in the latter its movements are resiliently opposed. The confinement is such that the guide is spaced from the surrounding walls of the case so as to realize certain advantages which will now be mentioned.

As the line guide is maintained in spaced relation to the walls of the case in which it is mounted, or is freely movable away therefrom, any blow or shock sustained by the case cannot be transmitted directly to the guide inside. For this reason the guide is protected to a much greater extent than if it were held fast within a rigid confining case, usually in juxtaposition to its walls. The guide being protected both circumferentially and upon its ends, may be formed of lesser diameter, and its line opening, axial or otherwise, may also be smaller, but without sacrifice of any kind, due to the capacity of the guide to float within its mounting according to the whippings or travel of the line. Should it be desired, the case walls may be thickened for greater strength, but with the duplex ring construction the double walls provide a protection far beyond what is obtained with the usual guide holder of the present time. This comes about because of the capacity of laminations constituting the case wall to give slightly and absorb shocks, with consequent enhanced protection to the guide confined therewithin.

With a floating mounting as hereinbefore described, the guide is free to rotate in its seat whereby to present successive portions of its interior surface to the confined line, and because of this circumstance to distribute over its entire surface such wear as results from friction from the line.

The advantages inhering in my invention may also be realized in a construction such as is shown in Fig. 4 wherein the line guide annulus is supported within an open-ended resilient case annulus 20 having opposed flanges 21 and 22 which retain the guide 8 in the manner indicated. Such a case may be produced conveniently from some such material as pyralin which furnishes a self-sustaining compressible cushion mounting for the guide. In this construction, as in the others already described, the guide is protected circumferentially and upon its ends by a mounting which serves in varying degrees to absorb and check external shocks, instead of transmitting them directly to the supported guide therewithin, and which will permit the guide to rotate therein about its own axis to present successive portions of its interior surface to the confined line as previously set forth.

It will be manifest from the various embodiments of my invention as are herein suggested that the exact form or construction of the supporting case may be modified within considerable limits, and that the cushion mounting for the guide may also be produced in any one of several different ways, withal realizing results and advantages that make for an improved structure; accordingly it is desired that these several features of novelty, irrespective of how embodied or combined, be protected to the fullest extent as defined by the claims follows.

I claim:

1. A case open at opposite ends, and an apertured line guide loosely confined within the case in a manner which permits movement therein in any direction.

2. A case open at opposite ends, and a line guide open through the center confined loosely within the case in a manner which permits movement therein in a radial direction.

3. A case open at opposite ends, and a line guide open through the center confined loosely within the case in a manner which permits movement therein in a direction longitudinally of a guided line.

4. An apertured line guide loosely confined for movement within a case with a cushion interposed therein.

5. A mounting providing an annular channel having opposed flanges, and an apertured line guide confined for movement within the channel of the mounting the flanges of which overlie opposite ends of the guide.

6. A laminated mounting providing an annular channel having opposed flanges between which is movably confined an apertured line guide.

7. A line guide mounted within a case having a flange at one end and fitted to the case an outer shell with a flange at the other end, the mounting providing a channel bounded circumferentially by adjacent walls constituting laminations.

8. A line guide and a rotatable support therefor comprising a resilient self-sustaining compressible mounting in which the guide is loosely held.

9. A line guide for fishing rods comprising a mounting, and a hollow line guide in the form of an annulus supported circumferentially by the mounting and rotatable relative thereto about its own axis.

10. A hollow line guide for a fishing rod comprising mutually supporting relatively rotatable inner and outer annuli, one affixed to the rod and the other serving as a line guide therefor.

11. A hollow line guide for a fishing rod comprising a mounting in the form of a fixed annulus disposed transversely of the rod and a second annulus carried circumferentially by the first and rotatable relative thereto about its own axis.

CHARLES HEDDON.